(12) United States Patent
Inami

(10) Patent No.: US 12,001,083 B2
(45) Date of Patent: Jun. 4, 2024

(54) RIM FRAME AND LENS STRUCTURE

(71) Applicant: Masayuki Inami, Kanagawa (JP)

(72) Inventor: Masayuki Inami, Kanagawa (JP)

(\*) Notice: Subject to any disclaimer, the term of this patent is extended or adjusted under 35 U.S.C. 154(b) by 0 days.

(21) Appl. No.: 17/881,094

(22) Filed: Aug. 4, 2022

(65) Prior Publication Data

US 2022/0373822 A1 Nov. 24, 2022

Related U.S. Application Data

(63) Continuation-in-part of application No. PCT/JP2021/002890, filed on Jan. 27, 2021.

(30) Foreign Application Priority Data

Feb. 5, 2020 (JP) .................................. 2020-018345

(51) Int. Cl.
*G02C 5/00* (2006.01)
*G02C 5/04* (2006.01)

(52) U.S. Cl.
CPC ............. *G02C 5/045* (2013.01); *G02C 5/008* (2013.01)

(58) Field of Classification Search
None
See application file for complete search history.

(56) References Cited

U.S. PATENT DOCUMENTS

| | | | | |
|---|---|---|---|---|
| 4,029,402 A | * | 6/1977 | Noble ................... | G02C 13/003 351/227 |
| 4,269,487 A | * | 5/1981 | Young ...................... | G02C 9/00 351/58 |
| 5,488,439 A | * | 1/1996 | Weltmann ............ | G02C 13/003 351/231 |
| 5,940,164 A | | 8/1999 | Deppi | |
| 2002/0101562 A1 | * | 8/2002 | Menon ..................... | G02C 1/06 351/86 |
| 2009/0135370 A1 | | 5/2009 | Xiao | |
| 2017/0219843 A1 | | 8/2017 | Albouy | |

FOREIGN PATENT DOCUMENTS

| | | |
|---|---|---|
| CN | 106796357 A | 5/2017 |
| CN | 209542990 U | 10/2019 |
| EP | 1 103 836 A1 | 5/2001 |

(Continued)

OTHER PUBLICATIONS

International Search Report dated Apr. 13, 2021 issued by the International Searching Authority in counterpart International Application No. PCT/JP2021/002890 (PCT/ISA/210).

(Continued)

*Primary Examiner* — Darryl J Collins

(74) *Attorney, Agent, or Firm* — Sughrue Mion, PLLC

(57) ABSTRACT

The rim frame and the lens are continuously restrained to each other over a range other than the gap to stabilize holding of the lens while attachment and detachment of the lens can be facilitated by expanding a gap as consolidating the gaps in the two places into one place due to the deflection of the rim frame and movement of the lens in the left-right direction, whereby the lens can be easily attached and detached without using a tool such as a screwdriver, while can achieve holding stability when fixing the lens and ease of attachment and detachment.

2 Claims, 3 Drawing Sheets

(56) References Cited

FOREIGN PATENT DOCUMENTS

| | | |
|---|---|---|
| GB | 779472 A | 7/1957 |
| JP | 59-161125 U | 10/1984 |
| JP | 5-71815 U | 9/1993 |
| JP | 6-16933 U | 3/1994 |
| JP | 2001-154156 A | 6/2001 |
| JP | 2001-215449 A | 8/2001 |
| JP | 2010-85523 A | 4/2010 |

OTHER PUBLICATIONS

International Written Opinion dated Apr. 13, 2021 issued by the International Searching Authority in counterpart International Application No. PCT/JP2021/002890 (PCT/ISA/237).
Office Action dated Feb. 8, 2024, issued by Chinese Patent Office in Chinese Patent Application No. 202180012794.1.

* cited by examiner

RIM FRAME AND LENS STRUCTURE

CROSS-REFERENCE TO RELATED APPLICATIONS

This is a continuation-in-part of International Application No. PCT/JP2021/002890 filed on Jan. 27, 2021, and claims priority from Japanese Patent Application No. 2020-018345 filed on Feb. 5, 2020, the entire content of which is incorporated herein by reference.

TECHNICAL FIELD

The present disclosure relates to simply assembled spectacles with a bridge length adjustment function.

BACKGROUND ART

Many variations exist in a shape and a size of a rim frame of spectacles. Usually, when a lens is put in the rim frame, it is necessary to carve a lens out of a round original lens in the same shape as a shape of the rim frame.

It is necessary for the carved lens that a distance between centers of left and right lenses fitted in the rim frame is almost the same as a distance PD between left and right eyes of a user.

Two methods are mainly present for attaching and detaching lenses in general full rim spectacles. The first is that since spectacles have a structure in which a ring of a lens frame is opened and closed by screw joint, the ring is expanded by loosening or removing the screw, and the lens is attached and detached. The second is that the lens frame is warmed to expand the ring and the lens is attached and detached. The second method is used for a cell frame or the like which does not include a screw joint portion.

As described above, processing of the lens according to the rim frame and attaching and detaching the lens require work, cost, and time.

In general spectacles, a rim frame and a lens are made of a hard material to some extent. A groove depth on an inner circumference of the rim frame is very shallow. Moreover, the groove in the inner circumference of the rim frame and an edge of the lens usually draw a three-dimensional curve and are processed separately, and thus, it is difficult to completely match the two under no load. Therefore, in reality, a slight deviation is allowed, the lens is prevented from falling off, rotating, and rattling by fitting the groove and the edge by deflection of a rim frame through methods such as tightening with a screw, and by pressing the lens inward over an entire circumference.

SUMMARY OF INVENTION

By eliminating a need for lens processing when manufacturing spectacles or exchanging lenses, and facilitating attachment and detachment of the lenses to and from the rim frame, the present disclosure provides a unit which easily obtains spectacles with a required specification.

A structure for solving the problem is illustrated in FIG. 1.

An aspect of non-limiting embodiments of the present disclosure provides a rim frame and lens structure, in which:

while having almost same shapes of a rim frame and a lens, the rim frame is designed to be narrower than an outer shape of the lens in an up-down direction and wider than the outer shape of the lens in a left-right direction;

a gap between the rim frame and the lens in a fixing state, where the lens is fixed by a force of the rim frame for returning to an original position by deflection of the rim frame, is limited to two places facing each other on the left and right; and the rim frame and the lens are continuously restrained to each other over a range other than the gap to stabilize holding of the lens while attachment and detachment of the lens can be facilitated by expanding a gap as consolidating the gaps in the two places into one place due to the deflection of the rim frame and movement of the lens in the left-right direction, whereby the lens can be easily attached and detached without using a tool such as a screwdriver, while achieving holding stability when fixing the lens and ease of attachment and detachment.

According to an aspect of the present disclosure, there is no need for processing of the lens or attaching and detaching the lens using tools, which is usually performed for each order at an optician or the like. Accordingly, the spectacles which are functionally equivalent to that handled by the optician or the like can be easily handled anywhere. Since lens variations are few, mass production of the lenses in advance becomes relatively easy, and in particular, a mass production effect of molding including an outer shape can be expected.

DESCRIPTION OF EMBODIMENTS

Figure 1:
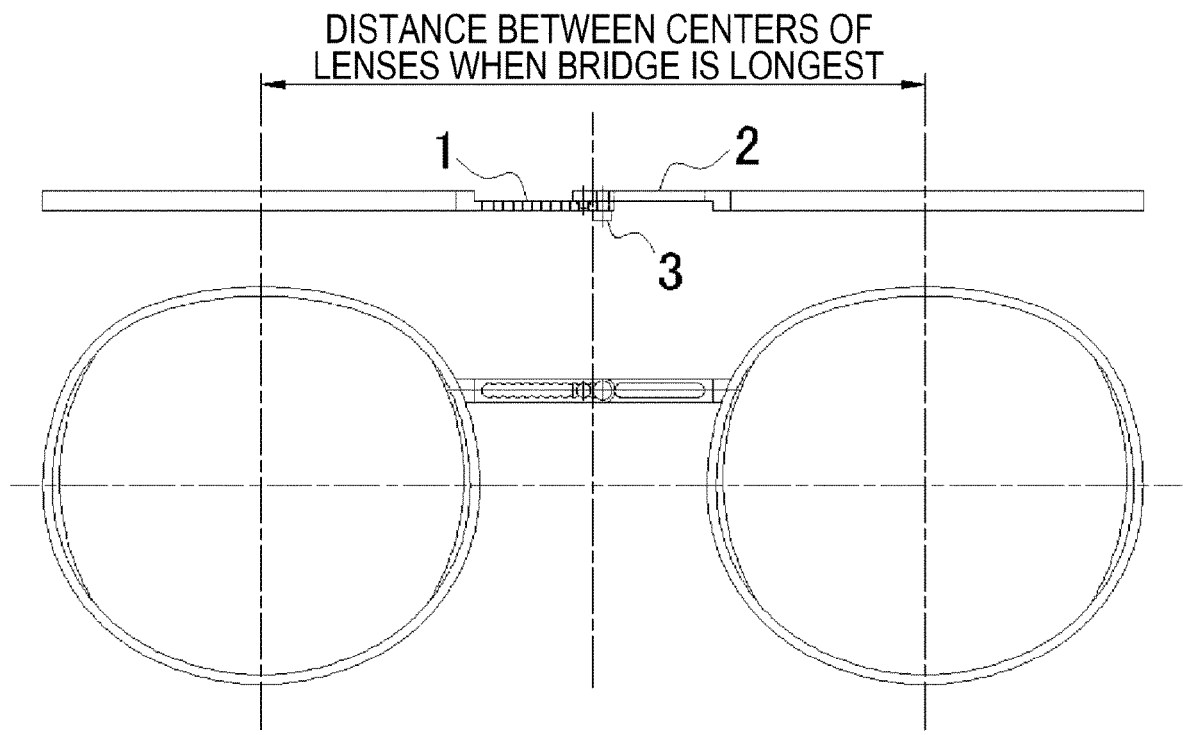
FIG. 1 is an explanatory diagram of an entire structure of spectacles.
Figure 2:
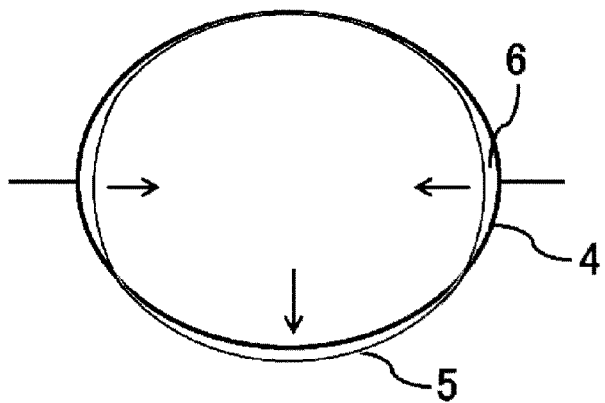
FIG. 2 is an explanatory diagram illustrating a state of a rim frame portion before fixing a lens.
Figure 5:
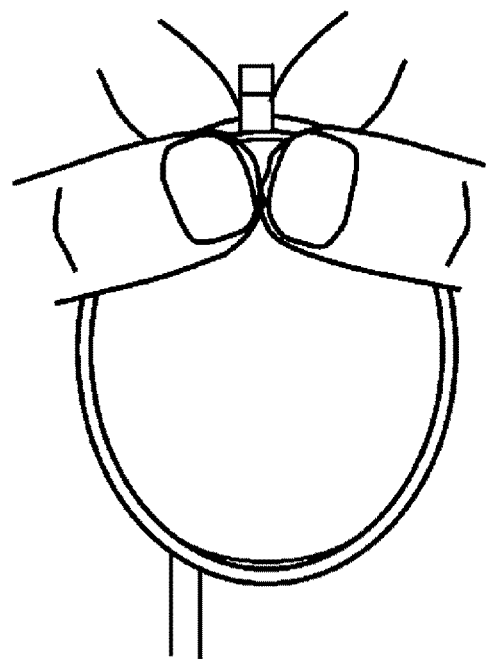
FIG. 5 is an example of a lens attachment and detachment method.

An embodiment of the present disclosure will be described below in detail with reference to the accompanying drawings. As illustrated in FIG. 1, spectacles include a rim frame 4, a lens 5, and bridges. The bridges include a left side bridge 1 and a right side bridge 2, and the left side bridge 1 is fastened to the right side bridge 2 by a fastening screw 3. A gap 6 exists in a part between a rim frame 4 and a lens 5 of the spectacles in FIG. 1, and the lens 5 is attached and detached by deflection of the rim frame 4. As illustrated in FIG. 2, the rim frame 4 is designed to be narrower than an outer shape of the lens in an up-down direction and wider than the outer shape of the lens in a left-right direction. In a state where the lens 5 is inserted in an upper or lower frame groove, if the lens 5 is inserted while a frame on an opposite side is expanded, the lens 5 is fixed by a force of the rim frame 4 for returning to an original position. When designing the rim frame 4 to be narrower than an outer shape of the lens in an up-down direction and wider than the outer shape of the lens in a left-right direction, if the difference between the rim frame 4 and the outer shape of the lens is too large, the deformation of the rim frame exceeds the elastic range during lens attachment and detachment, causing damage. On the other hand, if the difference is too small, sufficient spring force to retain the lens will not be applied. Therefore, a difference of approximately 1 to 2 mm is appropriate. The gaps at the left and right ends illustrated in FIG. 3, which is formed when the lens is fixed, are added separately from the 1 to 2 mm difference. When the lens 5 is detached, the rim frame 4 is pushed from the left and right to loosen tightening in the up-down direction while an end portion of the lens 5 is pushed in a front-back direction. Further, when the lens end is pushed while holding down the rim frame 4 in a gap portion as illustrated in FIG. 5, the lens 5 is detached by the gap widening due to the opening of the rim frame 4 and the movement of the lens in the left and right directions. These methods eliminate a need for a joint screw of the rim frame 4 and eliminate a need for a tool such as a screwdriver. If a shape of the rim frame is close to a circle, attachment and detachment are easy to be performed, but other shapes are also possible. A position and a size of the gap can be changed in various ways.

Figure 3:
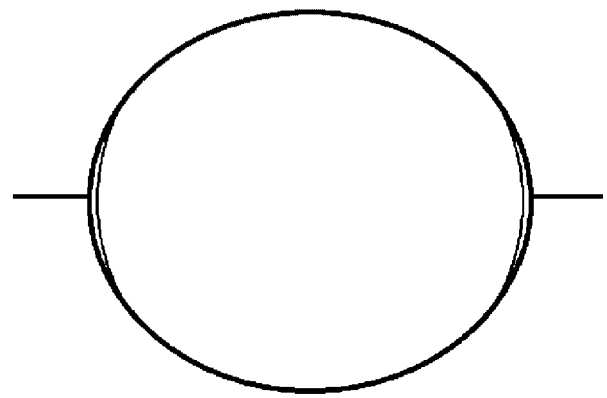
FIG. 3 is an explanatory diagram illustrating a state of the rim frame portion after fixing the lens.
Figure 6:
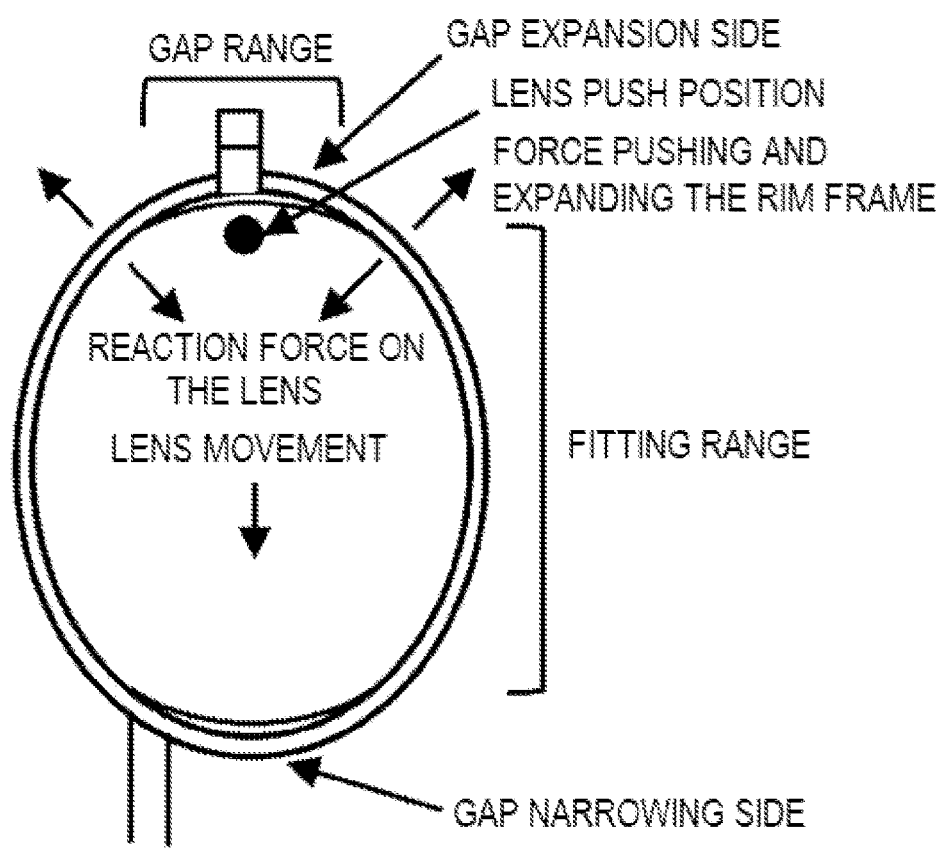
FIG. 6 illustrates a movement of the rim frame and lens in FIG. 5.

As illustrated in FIG. 3, the rim frame 4 and the lens 5 are designed to fit together in up-down direction at 60% or more of the total circumference of the rim frame when the lens is fixed, with gaps in two places on the left and right sides, and the rim frame and lens are continuously restrained to each other within the fitting range. Holding stability of the lens is enhanced by widening the restraining range and reducing the gap of the two places. However, if the gap length is too short, attaching and detaching the lens becomes difficult. Therefore, a gap of 20% or less of the total circumference of the rim frame is formed on one side as illustrated in FIG. 3. The appropriate gap length varies depending on material and shape of the rim frame and the lens. In this way, while having almost same shapes of the rim frame 4 and the lens 5, the gap 6 between the rim frame 4 and the lens 5 is limited to two places facing each other on the left and right, and the rim frame 4 and the lens 5 are continuously restrained to each other over a range other than the gap to stabilize holding of the lens 5 while attachment and detachment of the lens 5 can be facilitated by expanding a gap as consolidating the gaps in two places into one place due to the deflection of the rim frame and movement of the lens 5 in the left-right direction. FIG. 6 illustrates the movement of the rim frame 4 and the lens 5 in FIG. 5 in detail. When an end of the lens is pressed, an inclined plane of the edge on both sides of the lens press against an inclined plane of the groove of the rim frame, which are in contact with the inclined plane of the edge, and occur a force which pushes and expands the rim frame at an angle indicated by the arrow. At the same time, a reaction force is generated in the lens, and the combined force of the two side reaction forces pushes the lens downward. The lens moves while bending the rim frame, which causes the lower gap to narrow and the upper gap to widen. If any part of the lower gap is transferred to the upper gap, the gap is expanded. Accordingly, the expanded area allows more area for the lens to exit, holding stability when the lens is fixed and ease of attachment and detachment can be achieved. The smaller the gap, the better the holding stability of the lens 5.

Figure 4:
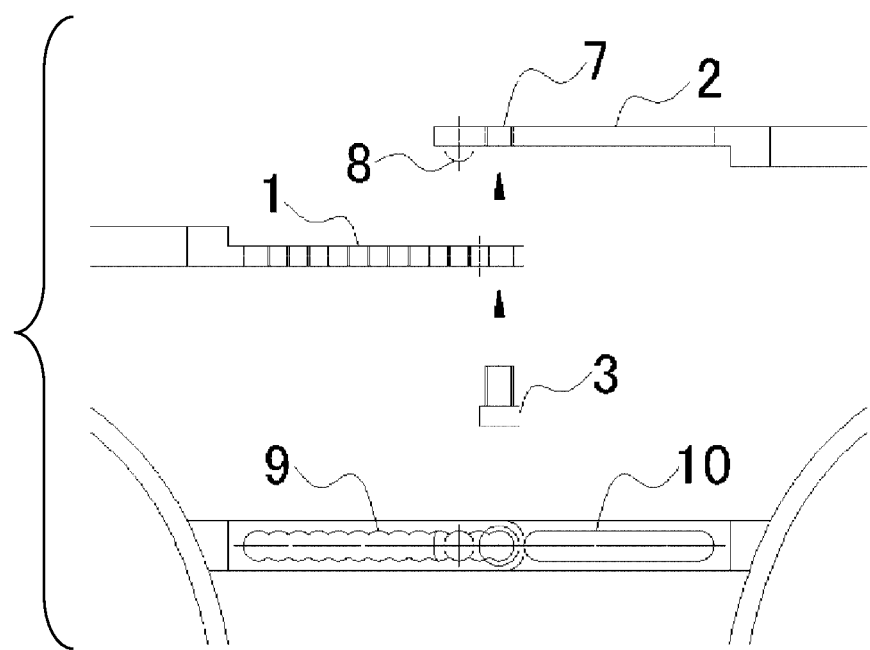
FIG. 4 is an explanatory diagram of a bridge portion.

As illustrated in FIG. 4, the left side bridge 1 includes an overlapping continuous round hole 9. The right side bride 2 includes a screw hole 7, a fastening auxiliary protrusion 8, and a balance lightening hole 10. As illustrated in FIG. 1, since the left side bridge 1 and the right side bridge 2 are fastened with a screw 3, a bridge length of spectacles can be changed by changing a fastening position. FIG. 1 illustrates a longest bridge. FIG. 4 illustrates a bridge structure. Note that FIG. 4 is an example, and does not have to be the same structure as long as stable fixing can be performed while the fastening position is changed. Fastening with two screws is also possible. Overlapping continuous holes 9 may be continuous holes which do not overlap, and in this case, a pitch for changing the length becomes longer. In general spectacles, a carving position from a round original lens is adjusted to match a center of the lens with a pupillary distance PD. Even if the spectacle frame and the power are the same, if the pupillary distance PD of a user is different, the processed lens becomes a different lens with a shifted center position. However, by making the bridge length variable and allowing the positions of the rim frame 4 and lens to be movable, it is unnecessary to adjust the center position by the lens processing, and the same lens can be used by people with different pupillary distances PD. Accordingly, the required lens variation can be reduced.

In order to further reduce the lens variation, types of the rim frame shape and a size of the spectacles in FIG. 1 are limited as much as possible. Since the spectacles of the present disclosure are intended to be easily obtained and does not emphasize design, at least one type of the spectacle having a relatively standard shape and size is sufficient.

According to the above method, the lens variation required for one type of the spectacle frame of the present disclosure is a difference in the power with the same outer shape. The lens group is manufactured and prepared in advance so as to be capable of being provided immediately. A purchaser selects a lens with a required power, fits the lens in the rim frame 4, and adjusts the bridge length to his/her own pupillary distance PD, and necessary spectacles are completed.

The spectacles of the present disclosure do not require lens processing or attachment and detachment work using a tool, which is usually performed for each order at an optician or the like. Accordingly, the spectacles which is functionally equivalent to that handled by the optician or the like can be easily handled anywhere. Since lens variations are few, mass production of the lenses in advance becomes relatively easy, and in particular, a mass production effect of molding including an outer shape can be expected.

When a bridge length changes, an overall width of the frame also changes. Generally, when a pupillary distance PD is short, a face width is narrow, and when the pupillary distance PD is long, the face width is wide, and thus changing the bridge length is also effective in optimizing the overall width of the frame.

The above lens attachment and detachment structure and bridge length adjustment structure can be adopted independently, and in this case, only a corresponding unique effect can be obtained.

The present disclosure can be used as an inexpensive and easily available ordinary spectacles, as well as temporary spectacles and a simple optometry frame that can be obtained immediately.

The invention claimed is:
1. Spectacles, comprising:
a lens; and
a rim frame in which the lens is inserted;
wherein a gap is formed between the rim frame and the lens at each place only on left and right sides of the spectacles,
the rim frame is deflectable,
the rim frame is narrower than an outer shape of the lens in an up-down direction and wider than the outer shape of the lens in a left-right direction,
the lens is fixed by a force of the rim frame for returning to an original position by deflection of the rim frame,
the lens and the rim frame are in a circular shape,
the lens is in contact with the rim frame in an arc, the rim frame and the lens are restrained to each other to stabilize holding of the lens, and the up-down direction and the left-right direction are orthogonal each other on an opening surface of the rim frame.

2. The spectacles according to claim 1, wherein a pair of the rim frames are arranged in the left-right direction through a bridge, and the lens and the rim frame are in a shape of an ellipse being horizontal in the left-right direction.

* * * * *